(12) United States Patent
Chang

(10) Patent No.: US 7,561,441 B1
(45) Date of Patent: Jul. 14, 2009

(54) FIXING STRUCTURE

(75) Inventor: Lin-Wei Chang, Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 12/010,129

(22) Filed: Jan. 22, 2008

(51) Int. Cl.
*H05K 7/12* (2006.01)

(52) U.S. Cl. .............. 361/801; 361/740; 361/747; 361/726; 361/685; 312/223.1

(58) Field of Classification Search .......... 361/726, 361/732, 740, 747, 759, 801, 807, 809, 685, 361/686; 312/223.1, 223.2, 223.3
See application file for complete search history.

(56) References Cited

U.S. PATENT DOCUMENTS

| | | | |
|---|---|---|---|
| 5,490,038 A * | 2/1996 | Scholder et al. | 361/759 |
| 6,252,765 B1 * | 6/2001 | Balzaretti et al. | 361/683 |
| 6,937,476 B1 * | 8/2005 | Chen et al. | 361/756 |
| 6,982,878 B2 * | 1/2006 | Chen et al. | 361/801 |
| 7,064,958 B2 * | 6/2006 | Chen et al. | 361/726 |
| 7,106,601 B2 * | 9/2006 | Chen et al. | 361/801 |
| 7,110,264 B2 * | 9/2006 | Chen et al. | 361/801 |
| 7,426,116 B1 * | 9/2008 | Peng | 361/756 |
| 7,430,115 B2 * | 9/2008 | Liu et al. | 361/685 |
| 7,430,129 B1 * | 9/2008 | Peng | 361/807 |

* cited by examiner

*Primary Examiner*—Dameon E Levi
(74) *Attorney, Agent, or Firm*—Bacon & Thomas, PLLC

(57) ABSTRACT

The present invention discloses a fixing structure applicable to a frame, wherein a first latch plate and a first support plate parallel to each other are disposed vertically on the frame. The fixing structure includes a board, a second latch plate disposed on a surface of the board, and a second support plate parallel to the second latch plate disposed on the board. When the fixing structure is placed on the surface of the frame, the first support plate is passed through a second opening of the fixing structure. A resilient element is pivotally coupled between the first support plate and the second support plate, such that the fixing structure can be moved on the frame by the resilience of the resilient element, enabling an operator to easily install or remove an electronic peripheral on or from the space between the first and second latch plates of the frame.

8 Claims, 3 Drawing Sheets

FIXING STRUCTURE

FIELD OF THE INVENTION

The present invention relates to a fixing structure, and more particularly to a fixing structure applicable to a frame of a computer equipment for enabling an operator to speedily and easily install or remove an electronic peripheral (such as an optical disk drive or a hard disk drive, etc.) on or from the frame.

BACKGROUND OF THE INVENTION

Recently, with the development of computer technologies, functions of computer equipments are continuously increased and improved, while the market price thereof is lower day by day. Thus, computer equipments have become affordable consumer products, or even indispensably important tools, in our daily life and work. In response to the heated competition in the computer market, various design houses and manufacturers of computer equipments have made great efforts to simplify the manufacturing processes and mechanism designs of computer equipments in order to effectively reduce the time and manpower required for installing the computer equipments, thereby increasing production speed, substantially lowering production cost, and effectively increasing the convenience in computer equipment maintenance in the future. Take electronic peripherals (such as an optical disk drive or a hard disk drive, etc.) for example, it is important for relevant manufacturers to figure out how to simplify the manufacturing processes and mechanism designs of computer equipments, so that an electronic peripheral can be speedily installed and secured on a frame of a computer equipment and speedily removed therefrom for repair or replacement when the electronic peripheral is damaged or out of order.

However, a manufacture will generally use a plurality of screws for installing, positioning and securing an electronic peripheral on a frame of a computer equipment. Before assembling, an operator has to prepare the screws and hand tools matching the screws. During the installing process of the electronic peripheral, the operator has to use the hand tools to fasten the screws into a plurality of holes on the electronic peripheral, one after another, so that the electronic peripheral is stably secured on the frame of the computer equipment. Similarly, if the operator wants to remove the electronic peripheral from the frame, the operator also needs the hand tools for unscrewing, one screw after another, for removing the electronic peripheral. Because of their small sizes, the screws are not only difficult to fasten and unscrew, but also get lost easily after being unscrewed. This may complicate the procedures for installing or removing the electronic peripheral on/from the frame, causing considerable inconvenience and creating a lot of troubles to the operator. As a result, the assembling or disassembling speed cannot be efficiently enhanced.

Therefore, it is an important goal of the present invention to develop a fixing structure which helps an operator to install or remove an electronic peripheral on/from a frame of a computer equipment in a more speedy and easier way.

SUMMARY OF THE INVENTION

It is therefore tried by the inventor to develop a fixing structure to solve the aforementioned problem that an operator has to screw or unscrew a plurality of screws, one after another, for installing or removing an electronic peripheral on/from a frame of a computer equipment, so as to simplify the conventional assembling and disassembling procedures, and thereby enhance an operator's efficiency in assembly and disassembly.

A primary objective of the present invention is to provide a fixing structure applicable to a frame, wherein the frame has a surface vertically formed with a first latch plate and a first support plate, the first latch plate and the first support plate are parallel to each other, and the surface of the frame is further formed with a retaining portion between the first latch plate and the first support plate. The fixing structure includes a board, a second support plate formed on the board, a second latch plate, and a bearing plate, wherein the second latch plate and the bearing plate are formed vertically from the board on two opposite sides thereof, respectively, and the second latch plate, the bearing plate, and the second support plate are parallel with each other. A first opening is formed on an abutting position between the board and the second latch plate, while a second opening is formed on another abutting position between the board and the bearing plate. Thus, when the fixing structure is placed on the surface of the frame, the retaining portion and the first support plate are passed through the first opening and the second opening of the fixing structure, respectively. Furthermore, a resilient element is pivotally coupled between the first support plate and the second support plate.

Therefore, the fixing structure, when under an external force, can be moved between the retaining portion and the first support plate of the frame, within spaces provided by the first opening and the second opening, by the resilience of the resilient element. When an operator installs an electronic peripheral (such as an optical disk drive or a hard disk drive, etc.) between the first latch plate of the frame and the second latch plate of the fixing structure, the fixing structure can be resiliently moved toward the first latch plate, so that the second latch plate and the first latch plate cooperate to clamp and secure the electronic peripheral. If the operator moves the fixing structure away from the first latch plate, the second latch plate will be separated from the electronic peripheral, so as to release the electronic peripheral. As a result, the operator can speedily and easily install or remove the electronic peripheral on/from the frame.

A secondary objective of the present invention is to provide a fixing structure as mentioned above, wherein the board is further formed with an engagement plate between the second support plate and the bearing plate. When the operator rotates the resilient element to a predetermined position, the resilient element will be engaged with the engagement plate and, therefore, prevented from being deformed by an external force. After the electronic peripheral is installed, the engagement between the resilient element and the engagement plate can effectively prevent the fixing structure from being pushed by the electronic peripheral pushing under an improper external force (such as a shaking caused by an accidental impact), so that the resilient element will not be deformed, and the fixing structure, therefore, will not move away from the first latch plate to disengage the electronic peripheral from the frame and the fixing structure.

A third objective of the present invention is to provide a fixing structure as mentioned above, wherein the board further has another two opposite sides, and the another two opposite sides each is formed with a reinforced flange. As a result, when the fixing structure is moved toward the first latch plate by the resilience of the resilient element to fix the electronic peripheral, a portion of the board between the resilient element and the electronic peripheral can bear a continuous pressure from the resilient element pushing the board toward the electronic peripheral. The reinforced flanges can substantially enhance the structural strength of the fixing structure, so as to prevent the fixing structure from being deformed by the pressure.

BRIEF DESCRIPTION OF THE DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE PREFERRED EMBODIMENTS

Figure 1:
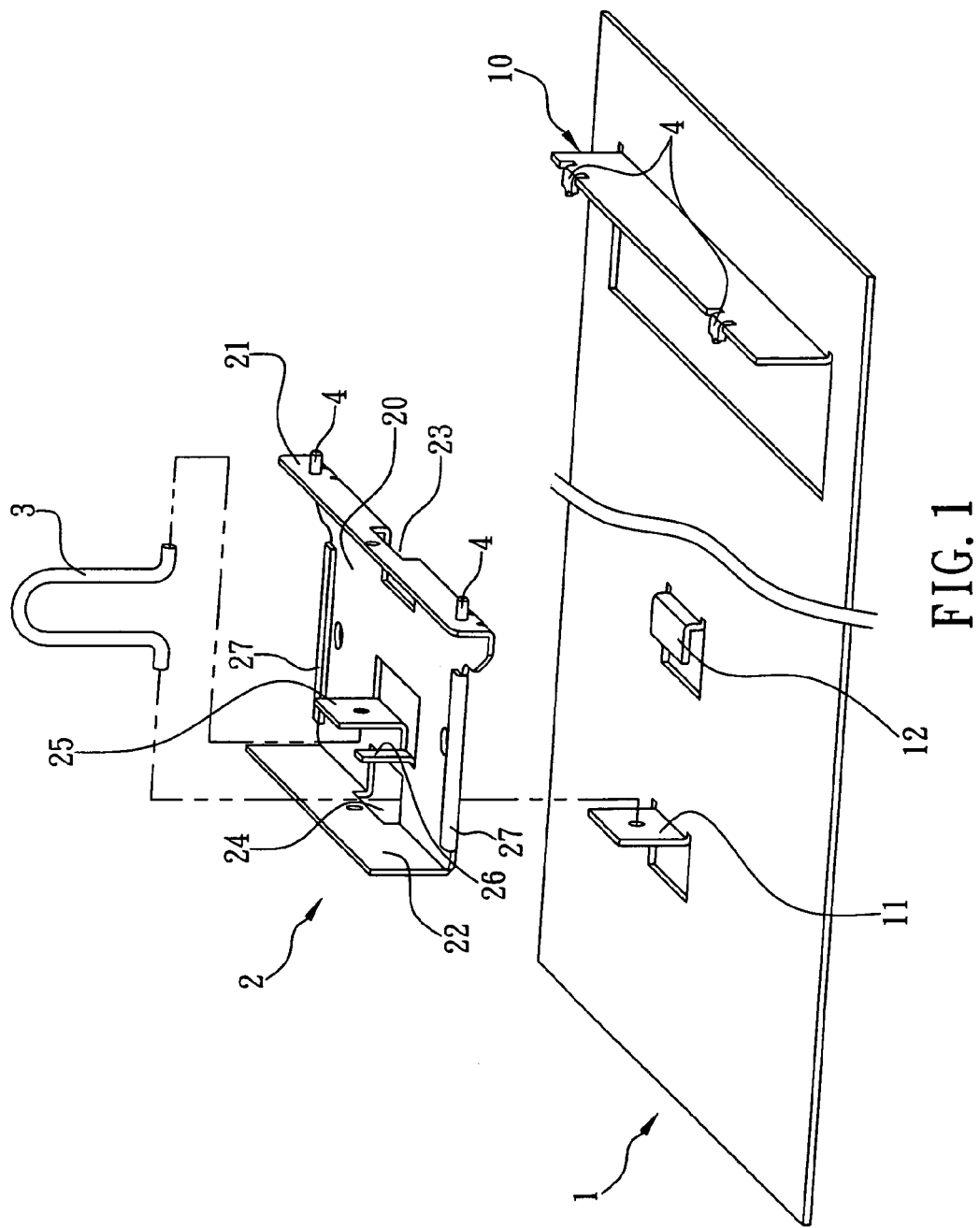
FIG. 1 is an exploded perspective view of a fixing structure according to a preferred embodiment of the present invention.
Figure 2:
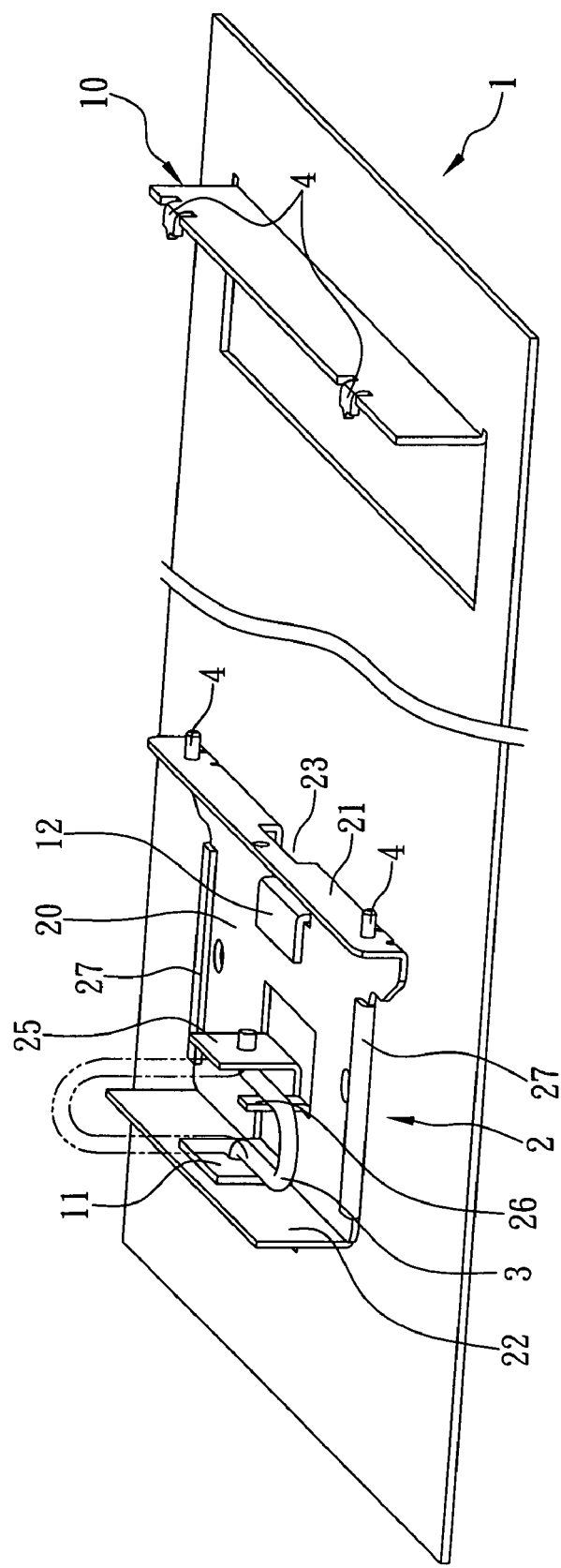
FIG. 2 is an assembled perspective view of the fixing structure according to the preferred embodiment of the present invention.

FIG. 1 illustrates a fixing structure 2 according to a preferred embodiment of the present invention. As shown in FIG. 1, the fixing structure 2 is applied to a frame 1 which has a surface vertically formed with a first latch plate 10 and a first support plate 11, wherein the first latch plate 10 and the first support plate 11 are parallel to each other. Meanwhile, the surface of the frame 1 is further formed with a retaining portion 12 between the first latch plate 10 and the first support plate 11. The fixing structure 2 comprises a board 20 having a second latch plate 21 vertically extending from one side, and a bearing plate 22 vertically extending from the other side opposite to the side formed with the second latch plate 21. Furthermore, a first opening 23 is formed on an abutting position between the second latch plate 21 and the board, while a second opening 24 is formed on another abutting position between the bearing plate 22 and the board 20. Moreover, the board 20 further comprises a second support plate 25 between the second latch plate 21 and the bearing plate 22, wherein the second latch plate 21, the bearing plate 22, and the second support plate 25 are parallel with each other. As a result, referring now to FIG. 2, when the fixing structure 2 is placed on the surface of the frame 1, the retaining portion 12 of the frame 1 can be passed through the first opening 23, and engaged with a portion of the board 20 adjacent to the first opening 23. Meanwhile, the first support plate 11 of the frame 1 can be passed through the second opening 24, and engaged with an inner surface of the bearing plate 22. In addition, the fixing structure 2 further comprises a resilient element 3 pivotally coupled between the second support plate 25 and the first support plate 11.

Figure 3:
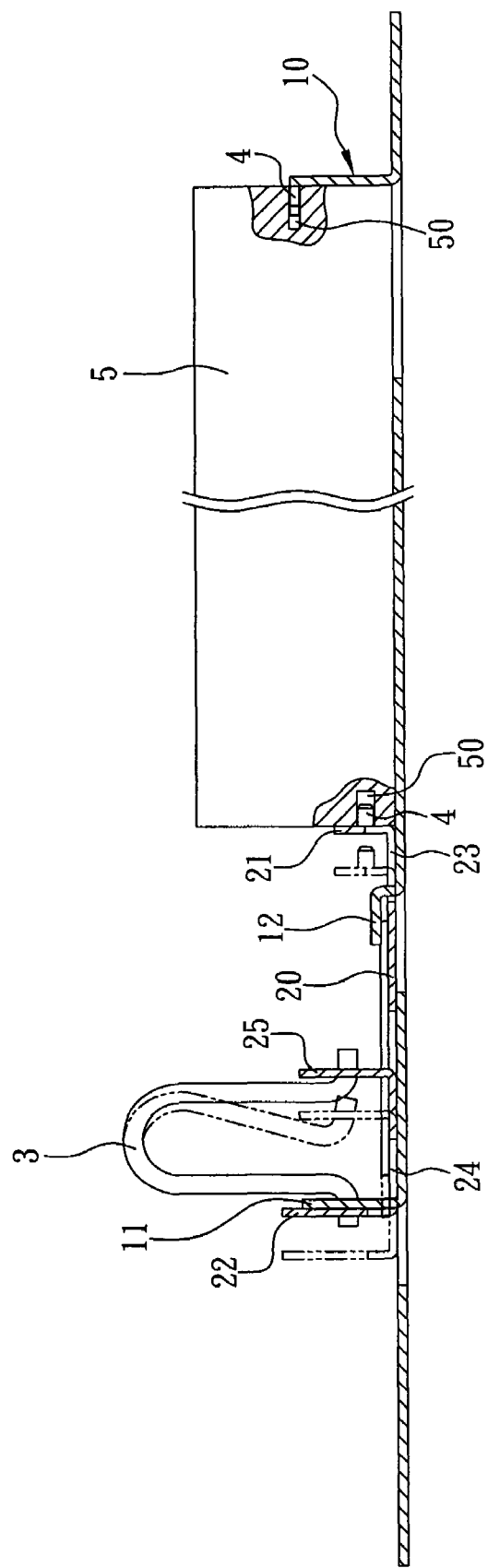
FIG. 3 is a cross-sectional view showing a state of use of the fixing structure according to the preferred embodiment of the present invention.

Therefore, referring now to FIGS. 1 and 3, the fixing structure 2, when under an external force, can be horizontally moved by the resilience of the resilient element 3 within a space provided by the second opening 24 adjacent to the first support plate 11. Thus, when an electronic peripheral 5 (such as an optical disk drive, a hard disk drive, etc.) is placed between the first latch plate 10 of the frame 1 and the second latch plate 21 of the fixing structure 2, the fixing structure 2 can be moved toward the first latch plate 10, so that the second latch plate 21 and the first latch plate 10 cooperate to clamp and secure the electronic peripheral 5. When the fixing structure 2 is moved away from the first latch plate 10, the second latch plate 21 will be separated from the electronic peripheral 5, so as to release the electronic peripheral 5. As a result, an operator can speedily and easily install or remove the electronic peripheral 5 on/from the frame 1 through the cooperation between the fixing structure 2 and the frame 1.

Referring back to FIG. 2, in the preferred embodiment of the present invention, the resilient element 3 preferably has an inverted U shape. The resilient element 3 has a first end pivotally connected to the second support plate 25, and a second end pivotally connected to the first support plate 11. Furthermore, the board 20 is formed with an engagement plate 26 between the second support plate 25 and the bearing plate 22. When the operator rotates the resilient element 3 toward the engagement plate 26, a portion of the resilient element 3 adjacent to the first end thereof will be placed into a space defined between the engagement plate 26 and the second support plate 25, so that the resilient element 3 is engaged with the engagement plate 26 and therefore prevented from being deformed. As a result, referring back to FIG. 3, after the operator secures the electronic peripheral 5 with the frame 1 and the fixing structure 2, the engagement between the resilient element 3 and the engagement plate 26 can effectively prevent the fixing structure 2 from being pushed by the electronic peripheral 5 under an improper external force (such as a shaking caused by an accidental impact), so that the resilient element 3 will not be deformed, and the fixing structure 2, therefore, will not move away from the first latch plate 10 to disengage the electronic peripheral 5 from the frame 1 and the fixing structure 2. Thus, the electronic peripheral 5 is stably installed between the frame 1 and the fixing structure 2.

Referring to FIG. 1 again, in the preferred embodiment of the present invention, a surface of the first latch plate 10 of the frame 1 facing the second latch plate 21 of the fixing structure 2 is formed with at least one insertion element 4, while a surface of the second latch plate 21 of the fixing structure 2 facing the first latch plate 10 of the frame 1 is also formed with at least one insertion element 4. Therefore, referring to FIG. 3 again, when the operator secures the electronic peripheral 5 with the frame 1 and the fixing structure 2, the insertion elements 4 are inserted respectively into a plurality of positioning holes 50 on two opposite sides of the electronic peripheral 5, so that the electronic peripheral 5 is stably fixed between the frame 1 and the fixing structure 2.

Referring back to FIG. 1, in the preferred embodiment of the present invention, the board 20 further has another two opposite sides different from the two opposite sides, and the two opposite sides are each formed with a reinforced flange 27. As a result, referring to FIG. 3 again, when the fixing structure 2 is moved toward the first latch plate 10 by the resilience of the resilient element 3 to secure the electronic peripheral 5, a portion of the board 20 between the resilient element 3 and the electronic peripheral 5 can bear a continuous pressure from the resilient element 3 pushing the board 20 toward electronic peripheral 5. The reinforced flanges 27 can substantially enhance the structural strength of the fixing structure 2, so as to prevent the fixing structure 2 from being deformed by the continuous pressure and effectively increase a service life of the fixing structure 2.

The present invention has been described with a preferred embodiment thereof and it is understood that many changes and modifications to the described embodiment can be carried out without departing from the scope of the present invention which is defined only by the appended claims.

What is claimed is:

1. A fixing structure applicable to a frame, wherein the frame has a surface vertically formed with a first latch plate and a first support plate, the first latch plate and the first support plate are parallel to each other, and the surface of the frame is further formed with a retaining portion between the first latch plate and the first support plate, the fixing structure comprising:

a board having a second latch plate formed on one side, a bearing plate formed on an opposite side, a first opening formed on an abutting position between the board and the second latch plate, a second opening formed on another abutting position between the board and the bearing plate, and a second support plate formed on the position between the second latch plate and the bearing plate, wherein the second latch plate, the bearing plate, and the second support plate are parallel with each other; and a resilient element having a first end pivotally connected to the second support plate;

whereby, when the fixing structure is placed on the surface of the frame, the retaining portion of the frame is passed through the first opening and engaged with a portion of the board adjacent to the first opening, the first support plate of the frame is passed through the second opening and engaged with an inner surface of the bearing plate, and a second end of the resilient element is pivotally connected to the first support plate.

2. The fixing structure of claim 1, wherein the board further comprises an engagement plate formed on the position between the second support plate and the bearing plate.

3. The fixing structure of claim 1, wherein the first latch plate and the second latch plate comprises at least one insertion element formed on surfaces of the first latch plate and the second latch plate facing with each other.

4. The fixing structure of claim 2, wherein the first latch plate and the second latch plate comprises at least one insertion element formed on surfaces of the first latch plate and the second latch plate facing with each other.

5. The fixing structure of claim 3, wherein the board further comprises two reinforced flange formed on another two opposite sides of the board respectively.

6. The fixing structure of claim 4, wherein the board further comprises two reinforced flange formed on another two opposite sides of the board respectively.

7. The fixing structure of claim 5, wherein the resilient element has an inverted U shape.

8. The fixing structure of claim 6, wherein the resilient element has an inverted U shape.

* * * * *